(12) United States Patent
James et al.

(10) Patent No.: US 7,737,205 B2
(45) Date of Patent: Jun. 15, 2010

(54) THERMOPLASTIC VULCANIZATES AND PROCESS TO PREPARE THEM

(76) Inventors: Susan Grace James, 117 Poinciana, Lake Jackson, TX (US) 77566; Robert Thomas Johnston, 117 Fawn Trail, Lake Jackson, TX (US) 77566

(*) Notice: Subject to any disclaimer, the term of this patent is extended or adjusted under 35 U.S.C. 154(b) by 0 days.

(21) Appl. No.: 10/900,001

(22) Filed: Jul. 27, 2004

(65) Prior Publication Data

US 2005/0140049 A1   Jun. 30, 2005

Related U.S. Application Data

(60) Provisional application No. 60/490,683, filed on Jul. 28, 2003.

(51) Int. Cl.
C08K 3/04 (2006.01)
(52) U.S. Cl. .................. 524/424; 524/426; 524/427
(58) Field of Classification Search .......... 524/424, 524/426, 427
See application file for complete search history.

(56) References Cited

U.S. PATENT DOCUMENTS

| | | | |
|---|---|---|---|
| 2,972,600 | A | 2/1961 | Braidwood |
| 3,037,954 | A | 6/1962 | Gessler et al. |
| 3,093,613 | A | 6/1963 | Fusco et al. |
| 3,287,440 | A | 11/1966 | Giller |
| 3,709,840 | A | 1/1973 | Dehoff |
| 3,758,643 | A | 9/1973 | Fischer |
| 4,130,535 | A | 12/1978 | Coran et al. |
| 4,311,628 | A | 1/1982 | Abdou-Sabet et al. |
| 4,543,399 | A | 9/1985 | Jenkins, III et al. |
| 4,588,790 | A | 5/1986 | Jenkins, III et al. |
| 4,994,534 | A | 2/1991 | Rhee et al. |
| 5,290,886 | A | 3/1994 | Ellul |
| 5,304,588 | A | 4/1994 | Boysen et al. |
| 5,317,036 | A | 5/1994 | Brady, III et al. |
| 5,453,471 | A | 9/1995 | Bernier et al. |
| 5,580,919 | A | 12/1996 | Agostini et al. |
| 5,585,431 | A * | 12/1996 | Igarashi et al. .............. 524/425 |
| 5,656,693 | A | 8/1997 | Ellul et al. |
| 5,741,858 | A | 4/1998 | Brann et al. |
| 5,783,645 | A * | 7/1998 | Baker et al. .................. 526/88 |
| 6,268,438 | B1 | 7/2001 | Ellul et al. |
| 6,268,444 | B1 | 7/2001 | Klosin et al. |
| 6,297,301 | B1 | 10/2001 | Erderly et al. |
| 6,326,426 | B1 | 12/2001 | Ellul |
| 6,420,507 | B1 | 7/2002 | Kale et al. |
| 6,451,915 | B1 | 9/2002 | Ellul et al. |
| 6,815,062 | B2 * | 11/2004 | Caimi et al. ................. 428/390 |
| 7,521,501 | B2 | 4/2009 | James et al. |
| 2002/0076566 | A1 | 6/2002 | Bradys et al. |
| 2002/0128390 | A1 | 9/2002 | Ellul et al. |
| 2007/0129483 | A1 | 6/2007 | James et al. |
| 2007/0265387 | A1 | 11/2007 | James et al. |

FOREIGN PATENT DOCUMENTS

| | | |
|---|---|---|
| CA | 2190678 A1 | 5/1997 |
| EA | 1591458 A2 | 11/2005 |
| EP | 0363006 | 4/1990 |
| EP | 0 775 718 | 5/1997 |
| EP | 0 775 719 | 5/1997 |
| EP | 1 054 025 | 11/2000 |
| EP | 1 054 025 A1 | 11/2000 |
| EP | 0 946 574 | 2/2002 |
| EP | 1 178 996 | 3/2003 |
| EP | 1419183 B1 | 12/2005 |
| GB | 1128212 | 9/1968 |
| WO | WO-00/26279 | 5/2000 |
| WO | WO-00/37267 | 6/2000 |
| WO | WO-00/69930 | 11/2000 |
| WO | WO 01/21705 | 3/2001 |
| WO | WO-01/72894 A1 | 10/2001 |
| WO | WO 02/051928 A2 * | 7/2002 |
| WO | WO-02/100940 | 12/2002 |
| WO | WO 02/100940 * | 12/2002 |
| WO | WO-03/059963 A1 | 7/2003 |

OTHER PUBLICATIONS

Grant, Christopher S., et al, Paper No. 19 presented at the 162nd meeting of the Rubber Division, American Chemical Society, Oct. 8-11, 2002, entitled "Properties and performance of EPDM produced via gas-phase process using constrained geometry catalyst technology".

Martin, Sarah L., et al., Paper No. 17 presented at the 162th meeting of the Rubber Division, American Chemical Society, Oct. 8-11, 2002, entitled "Development of Metallocene Catalyst Technology for the Manufacture of Ethylene-propylene-diene Rubber via the Gas Phase Process".

International Search Report of International Application No. PCT/US2004/024762.

Written Opinion of International Application No. PCT/US2004/024762.

Radar, C. P., & Abdou-Sabet, S. (1990). Two phase elastomeric alloys. *Thermoplastic Elastomers from Rubber-Plastic Blends*. 159-197.

Bhowmich, A.K., & Inoue, T. (1993). Structure development during dynamic vulcanization of hydrogenated nitrile rubber/nylon blends. *Journal of Applied Polymer Science*. 49, 1893-1900.

(Continued)

*Primary Examiner*—Robert D. Harlan

(57) ABSTRACT

Highly oil-filled ethylene/alpha-olefin/diene (EAODM) polymers in a free flowing powder or pellet form, processes for preparing these polymers, and the use of these polymers to prepare thermoplastic vulcanizates (TPV) are provided. Thermoplastic vulcanizate premixes can be prepared with the EAODM polymers and thermoplastic polymers, the premixes being easily converted into TPVs.

14 Claims, 2 Drawing Sheets

OTHER PUBLICATIONS

Coran, A.Y., & Patel, R. (1980). Rubber-Thermoplastic Compositions Part I. EPDM-polypropylene Thermoplastic Vulcanizates. *Rubber Chemistry and Technology*. 53, 141-150.

Coran, A.Y., R. Patel and D. Williams, Rubber-Thermoplastic Compositions Part V. Selecting Polymers for Thermoplastic Vulcanizates, Chem. Tech., 55 (1982) pp. 116-136.

C.W. Evans, " Powdered Rubber", in A.K. Bhowmick and H.L. Stephens, eds., Handbook of Elastomers, 2nd Ed. Marcel Kekker, New York, 2001. pp. 167-195.

Coran, A.Y. and R. Patel, Rubber-Thermoplastic Compositions Part IV. Thermoplastic Vulcanizates From Various Rubber-Plastic Combination, Rub. Chem. Tech., 54 (1981) pp. 892-903.

* cited by examiner

THERMOPLASTIC VULCANIZATES AND PROCESS TO PREPARE THEM

CROSS-REFERENCE TO RELATED APPLICATIONS

This application claims the benefit of U.S. Provisional Application No. 60/490,683 filed Jul. 28, 2003.

FIELD OF THE INVENTION

This invention relates to low odor, highly oil filled ethylene alpha olefin diene (EAODM) polymers in a free flowing powder or pellet form, processes for preparing these polymers, and the use of these polymers to prepare thermoplastic vulcanizates (TPV). The invention also relates to thermoplastic vulcanizate premixes prepared with EAODM polymers and thermoplastic polymers, the premixes being easily converted into TPVs.

BACKGROUND OF THE INVENTION

Typically, high Mooney EAODM polymers produced by solution or slurry polymerization processes are sold as bales and with oil already imbibed to allow for easier processing and handling. Generally, if these polymers are to be sold in pellet or powder form they must be coated with a partitioning agent to prevent agglomeration of the particles into a large mass or bale.

EP 0775718A2 teaches the use of gas phase EAODM in TPV's and thermoplastic polyolefins. EAODM is produced by a gas phase process in powder or pellet form. However, these EAODM polymers, in powder or particle form, tend to absorb oil relatively slowly.

TPV's are generally produced by dynamic vulcanization of elastomeric polymers such as EAODM polymers in a thermoplastic matrix polymer. Generally, a thermoplastic polymer and elastomer should be intimately melt mixed prior to vulcanization as discussed in C. P. Rader and S. Abdou-Sabet, "Two-phase elastomer alloys," in S. K. De and A. K. Bhowmick, eds., Thermoplastic Elastomers from Rubber-Plastic Blends, Ellis Horwood, New York, 1990, pp 159-197 and U.S. Pat. No. 4,311,628; Bhowmick A. K. and Inoue T., *Journal of Applied Polymer Science*, Vol. 49 (1993) page 1893. During dynamic vulcanization, the elastomer is converted to a crosslinked material dispersed as small particles in a continuous thermoplastic matrix. The result is a useful composition or TPV having the melt processability of thermoplastics combined with the rubber-like properties of crosslinked elastomers, including elastic recovery, heat resistance; compression set resistance, and softness.

According to Coran A. Y. and Patel R., *Rubber and Chemical Technology*, Vol. 53, (1980), p. 141 it is preferable to produce a melt dispersion containing the smallest polymer particle size for the rubber phase as possible before crosslinking which yields a TPV with superior physical properties such as tensile strength and elongation.

U.S. Pat. No. 4,130,535 teaches that a curative is preferably added to a mixture of elastomer, thermoplastic, and filler. The reason for the preference of the first method is not stated, but one possible theory is that the delayed addition of curative allows a finer particle morphology to be developed prior to the onset of crosslinking, which "locks in" the particle size/shape. Thus, by mixing the polymers and optionally added fillers, plasticizers, and other additives first, and only adding the curative after these are well melt-mixed, a small particle size and improved physical properties might be obtained.

It would be beneficial if an improved and easier method could be found for producing finely dispersed elastomer or EAODM particles in a thermoplastic polymer melt mixture, resulting in TPVs with improved physical properties.

SUMMARY OF THE INVENTION

It is one aspect of this invention to provide highly oil filled EAODM polymers in free flowing powder or pellet form. The oil filled EAODMs of this invention are prepared by dry mixing the EAODM particles with oil, and optionally with additional additives such as, but not limited to, thermoplastic polymers, vulcanizing agents and/or activators. The oil imbibed EAODMs are free flowing particles or powders.

It is another aspect of this invention to provide an improved process for preparing TPVs using highly oil filled EAODM polymers, especially in continuous mixing processes, in which an encapsulated vulcanizing agent or cure activator, or both, are mixed with an EAODM polymer, oil, optionally with additional additives, in a melt mixing device and where the EAODM is dynamically vulcanized to prepare a TPV. The order of addition of the EAODM polymer, oil, and other additives are not critical as long as the vulcanizing agent or activator is melt mixed with the thermoplastic polymer, optionally with other additives, to encapsulate the vulcanizing agent or activator before addition of the encapsulated cure material to the other materials used to prepare the TPV. TPVs produced by such processes have improved tensile properties compared to analogous processes that do not use an encapsulated cure system.

A second aspect of this invention is a process for preparing TPV premixes of this invention using highly oil filled, free flowing, high molecular weight, low odor EAODM powders. These TPV premixes can then be used to prepare TPVs.

A third process variation for preparing TPVs of this invention requires the vulcanizing agent and/or cure activator be added downstream in the melt mixing device. Downstream is defined as addition anywhere during the melt processing or dynamic vulcanization of the EAODM mixture except the very beginning of the process.

A fourth process variation involves addition of the EAODM, thermoplastic polymer, vulcanizing agent, and optionally, other additives at the beginning or entrance point of the melt mixing device. Before the EAODM has lost its particle or powder shape (i.e., before melting), hot oil, optionally containing additional additives, is fed into the mixture resulting in an oil imbibed EAODM mixture.

DETAILED DESCRIPTION OF THE INVENTION

Figure 1:
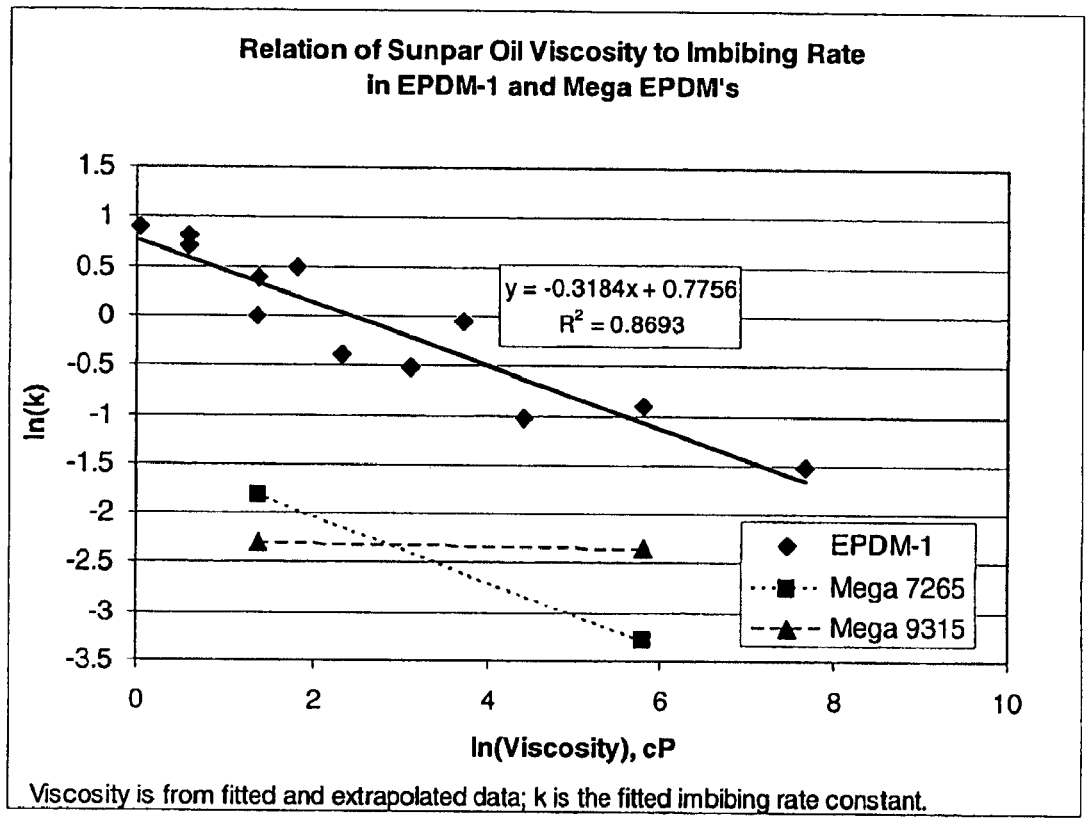
FIG. 1 illustrates the viscosity dependence of the oil imbibing rate constant.
Figure 2:
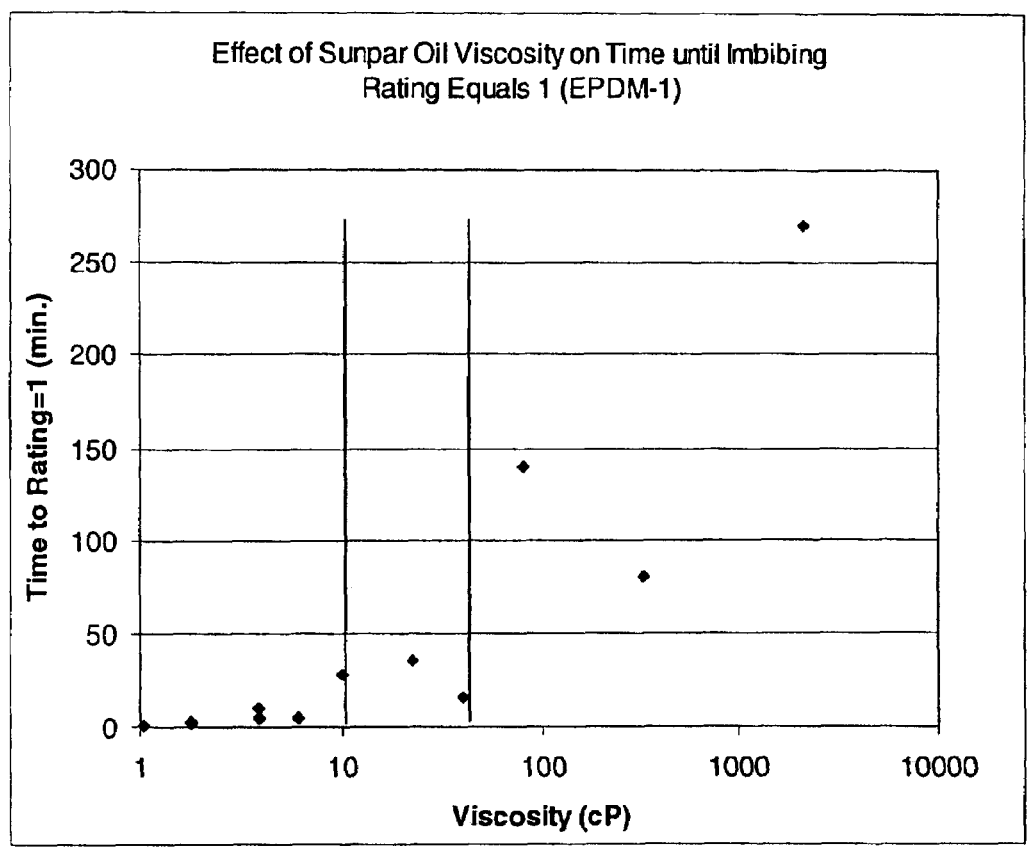
FIG. 2 illustrates the time until an Imbibing Rating of "1" was achieved in a metallocene EPDM, as a function of viscosity.

The low odor, free flowing, high molecular weight EAODM powder or particles used in this invention is produced by a gas phase polymerization in at least one fluidized bed reactor using one or more of carbon black, silica, or other fine particles as partitioning or fluidization agent, and at least one metallocene catalyst. For purposes of this invention, it is preferable to use a constrained geometry metallocene catalyst and carbon black as a fluidization agent.

The EAODM is prepared from any combination of ethylene and at least one $C_{3-20}$ α-olefin monomer, and at least one polyene. Skilled artisans can readily select appropriate monomer combinations for any desired interpolymer. The α-olefin may be either an aliphatic or an aromatic compound and may contain vinylic unsaturation or a cyclic compound, such as cyclobutene, cyclopentene, or norbornene, including norbornene substituted in the 5 or 6 position with a $C_{1-20}$ hydrocarbyl group. The α-olefin is preferably a $C_{1-20}$ aliphatic compound, more preferably a $C_{3-10}$ aliphatic compound, and still more preferably a $C_{3-8}$ aliphatic compound. The α-olefin includes, but is not limited to propylene, isobutylene, butene-1, pentene-1, hexene-1,3-methyl-1-pentene, 4-methyl-1-pentene, octene-1, decene-1 and dodecene-1 and mixtures thereof. Other ethylenically unsaturated monomers include 4-vinylcyclohexene, vinylcyclohexane, norbornadiene, and mixtures thereof. The most preferred α-olefins are propylene, butene-1, hexene-1 and octene-1. The ethylene content of the EAODM is preferably from 40 to 90 wt %, more preferably from 55 wt % to 75 wt %, and most preferably from 60 wt % to 75 wt %, based on total interpolymer weight.

The polyene, sometimes referred to as a diolefin or a diene monomer, is desirably a nonconjugated diolefin, but may be a conjugated diolefin. The nonconjugated diolefin can be a straight chain, branched chain or cyclic hydrocarbon diene.

Illustrative nonconjugated dienes are linear dienes such as 1,4-hexadiene, 1,5-hexadiene, 1,6-octadiene, and 1,9-decadiene; branched chain acyclic dienes such as 2-methyl-1,5-hexadiene, 6-methyl-1,5-heptadiene, 7-methyl-1,6-octadiene, 3,7-dimethyl-1,6-octadiene, 3,7-dimethyl-1,7-octadiene, 5,7-dimethyl-1,7-octadiene, and mixed isomers of dihydromyrcene; single ring alicyclic dienes such as 1,4-cyclohexadiene, 1,5-cyclooctadiene and 1,5-cyclododecadiene; multi-ring alicyclic fused and bridged ring dienes such as tetrahydroindene, methyl tetrahydroindene, dicyclopentadiene (DCPD), bicyclo-(2,2,1)-hepta-2,5-diene (norbornadiene or NBD), methyl norbornadiene; alkenyl, alkylidene, cycloalkenyl and cycloalkylidene norbornenes such as 5-methylene-2-norbornene (MNB), 5-ethylidene-2-norbornene (ENB), 5-vinyl-2-norbornene (VNB), 5-propenyl-2-norbornene, 5-isopropylidene-2-norbornene, 5-(4-cyclopentenyl)-2-norbornene and 5-cyclohexylidene-2-norbornene. When the diolefin is a conjugated diene, it can be 1,3-pentadiene, 1,3-butadiene, 2-methyl-1,3-butadiene, 4-methyl-1,3-pentadiene, or 1,3-cyclopentadiene.

The diene is preferably a nonconjugated diene selected from ENB, VNB, and NBD, more preferably, ENB and VNB and most preferably ENB. The EAODM polyene monomer content is preferably within a range of from greater than zero to about 10 percent (mol %), based on moles of ethylene and α-olefin. On a weight basis, the EAODM polyene monomer content equates to the mole-percent limitations and will vary depending upon weight of the polyene. Broadly speaking, the polyene content is from greater than zero to 15 wt %, more preferably from 0.3 to 12 wt %, and most preferably from 0.5 to 10 wt % based on interpolymer weight.

Surprisingly, it has been found that free flowing EAODMs prepared via the gas phase process using a metallocene catalyst and a partitioning agent, not only have low odor, but the EAODM particles can be rapidly imbibed, in a dry blending process, with from about 25 phr (pounds per hundred) to about 300 phr oil per 100 parts EAODM. The amount of oil which can be added to the EAODMs of this invention will partly depend on the amount of partitioning agent in the EAODM. The greater the quantity of partitioning agent in the EAODM the greater the quantity of oil which can be imbibed into the EAODM and still maintain a dry, free flowing material.

The metallocene catalyst used in the gas phase process to prepare the EAODMs is preferably a constrained geometry catalyst (CGC). Non-limiting examples of CGC include those described in U.S. Pat. No. 6,420,507, U.S. Pat. No. 6,268,444 and European patents EP 1 178 996 B1 and EP 0 946 574 B1, all of which are incorporated herein by reference.

Preferably, the EAODMs have a calculated polymer Mooney viscosity of at least 80. The calculated viscosity is determined by correcting for the effect of the partitioning agent.

The thermoplastic polymers used in this invention include, for example, homopolymers and copolymers of propylene (collectively referred to as "PP"). The PP copolymers contain about 1 to 20 percent by weight of ethylene or an α-olefin comonomer of 4 to 16 carbon atoms, and mixtures thereof. Examples of α-olefins include butene, pentene, hexene, octene, and 4-methyl-1-pentene copolymers. Additionally, the PP can be prepared from polar monomers such as maleic acid esters, acrylic and methacrylic acid esters. The PP can be prepared by typical Ziegler-Natta or metallocene catalysts. Suitable thermoplastic polymers comprise crystalline, high molecular weight solid products from the polymerization of one or more monoolefins by either high pressure or low pressure processes. Examples of such polymers are the isotactic and syndiotactic monoolefin polymers, representative members of which are commercially available. Commercially available thermoplastic polymers, preferably polyethylene or polypropylene homopolymers or copolymers, may be advantageously used in the practice of the invention, with polypropylene homopolymers and copolymers being preferred.

The thermoplastic polymers also include polyethylenes and their related copolymers such as butene, propylene, hexene, octene, 4-methyl-1-pentene copolymers; functional grades of polyethylenes such as maleic acid esters, acrylic and methacrylic acid esters, acrylonitrile, vinyl acetate, and derivatives such as chlorinated and sulfonated polyethylenes and copolymers; ionomers; polyvinyl chlorides and their related copolymers, functional and modified grades; polymers of acetal and their related copolymers and modified grades; fluorinated olefin polymers; polyvinylidene fluoride; polyvinyl fluoride; polyamides and their modified grades; polyimides; polyarylates; polycarbonates and their related copolymers and modified grades; polyethers; polyethersulfones; polyarylsulphones; polyketones; polyetherimides; poly(4-methyl-1-pentene); polyphenylenes and modified grades; polysulphones; polyurethanes and their related modified grades; polyesters and their related modified grades; polystyrene and their related copolymers and modified grades; polybutylene; polymers of acrylo-nitrile, polyacrylates, mixtures thereof, and the like.

For purposes of this invention, vulcanizing agents include vulcanizing materials or curatives which do not require the addition of a curing or vulcanizing activator. The vulcanizing agent also includes a vulcanizing material or curative which requires the addition of a cure activator or vulcanizing activator to the vulcanizing material. If a vulcanizing agent is used which requires the further addition of a vulcanizing or cure activator, either the cure activator or the vulcanizing agent, or both, can be encapsulated in the processes of this invention. Typically, when an encapsulated cure system is used a vulcanizing agent which requires the addition of a cure activator or vulcanizing activator is used.

Any vulcanizing agent, or combination of vulcanizing agents, suitable for EAODM or monoolefin rubber may be used in the practice of this invention. Examples of suitable vulcanizing agents are accelerated sulfur systems including efficient and semi-efficient systems, peroxide systems alone or with co-agents, phenolic resin curative systems, phenylenebismaleimide, urethane curatives, grafted alkoxysilanes, hydrosilylation curatives, and diamine curatives.

A preferred class of vulcanizing agents used in this invention are the phenolic curatives. A particularly suitable phenolic curative is a phenolic curing resin made by condensation of halogen substituted phenol, $C_1$-$C_{10}$ alkyl substituted phenol (preferably substituted in the para position), or non-substituted phenol with an aldehyde (preferably formaldehyde) in an alkaline medium or by condensation of bi-functional phenol dialcohols. Dimethylol phenols substituted with $C_5$-$C_{10}$ alkyl in the para-position are more preferred. Halogenated alkyl substituted phenol curing resins prepared by halogenation of alkyl-substituted phenol curing resins also can be used. Phenolic curing systems may comprise methylol phenolic resins with or without activator such as halogen donor and metal compound. Details of this are described in Giller, U.S. Pat. No. 3,287,440 and Gerstin et al, U.S. Pat. No. 3,709,840. Non-halogenated phenolic curing resins may be used in conjunction with halogen donors, preferably along with a hydrogen halide scavenger. Sometimes, halogenated, preferably brominated, phenolic resins containing 2 to 10 weight percent bromine are used in conjunction with a hydrogen halide scavenger such as metal oxides, for example, iron oxide, titanium oxide, magnesium oxide, magnesium silicate, silicon dioxide, and preferably zinc oxide. The presence of metal oxide and halogen donor singly or together promote the crosslinking function of the phenolic resin. The preparation of halogenated phenolic resin and their use in a curative system comprising zinc oxide are described in U.S. Pat. Nos. 2,972,600 and 3,093,613, the disclosure of which is incorporated herein by reference. When using either a halogenated phenolic curing resin or halogen donor activator, it is essential that the total amount of metal halide (present initially or formed in situ) does not exceed two parts by weight per 100 parts by weight of rubber. Preferred phenolic curing resins contain between about 5-15 weight percent methylol groups. A preferred phenolic curative comprises a non-halogenated dimethylol phenolic resin and zinc oxide.

Suitable phenolic resin curatives are commercially available under the trade name SP-1045 (octylphenol/formaldehyde heat reactive resin), SP-1055, and SP-1056 (brominated octylphenol/formaldehyde heat reactive resins) and are available from Schenectady International, Inc. of New York.

Conventional sulfur curative systems are also suitable as cure systems for the TPVs of this invention either with a sulfur vulcanizing agent alone or with sulfur and a vulcanization accelerator.

The sulfur donor curative systems suitable in the practice of the invention comprise conventional sulfur donor vulcanizing agents. Suitable sulfur donors include alkyl polysulfides, thiuram disulfides, and amine polysulfides. Examples of suitable sulfur donors are 4,4'-dithiomorpholine, dithiodiphosphorodisulfides, diethyldithiophosphate polysulfide, alkyl phenol disulfide, and tetramethylthiuram disulfide. The sulfur-donors may be used with conventional sulfur-vulcanizing accelerators, for example, thiazole accelerators such as benzothiazyl disulfide, N-cyclohexyl-2-benzothiazolesulfenamide, 2-mercaptobenzothiazole, N-tert.-butyl-2-benzothiazolesulfenamide, 2-benzothiazyl-N,N-diethylthiocarbamyl sulfide, 2-(morpholinodithio)benzothiazole, and N,N-dimorpholinodithiocarbamate. Of course, accelerators such as dithiocarbamates or thiurams and thioureas can be included in these sulfur cures which also normally include zinc oxide.

Examples of vulcanizing activators include halogen donors and metal halide activators such as stannous chloride (anhydrous or hydrated), ferric chloride, zinc chloride, or halogen donating polymers such as chlorinated paraffin, chlorinated polyethylene, chlorosulfonated polyethylene, and polychlorobutadiene. The term "activator", as used herein, means any material which materially increases the crosslinking efficiency of the vulcanizing agent or curative and includes metal oxides and halogen donors used alone or conjointly.

The skilled artisan will be able to readily determine a sufficient or effective amount of vulcanizing agent and if necessary, vulcanizing activator to be employed without undue calculation or experimentation. The amount of vulcanizing agent should be sufficient to at least partially vulcanize the elastomeric polymer. In general, the amount of vulcanizing agent comprises from about 1 to about 20 parts by weight, more preferably from about 3 to about 16 parts by weight, and even more preferably from about 4 to about 12 parts by weight, vulcanizing agent per hundred parts by weight rubber (phr).

The oils used in this invention include paraffinic, naphthenic, aromatic oils, and low to medium molecular weight organic esters and alkyl ether esters. Examples of suitable oils include those listed as ester plasticizers in Ellul, U.S. Pat. No. 6,326,426, which is incorporated herein. An artisan skilled in the processing of elastomers in general and TPV compositions of this invention in particular will recognize which type of oil will be most beneficial. The process oils, when used to prepare the TPV premix, are generally present in an amount within a range of 25 to 300 wt %, per hundred parts rubber. The oils used in this invention can be blended with additional additives before being imbibed into the EAODM particles. Preferably, from about 50 to about 200 parts by weight, and more preferably from about 75 to about 150 parts by weight of oil, per hundred parts rubber is added.

The quantity of oil added depends upon the properties desired in the final TPV, with the upper limit depending upon the compatibility of the particular oil and blend ingredients; this limit is exceeded when excessive exuding of oil occurs. If a freeflowing TPV premix is used in the process, the quantity of oil added also depends upon the amount of partitioning agent used. Greater quantities of partitioning agent added to the EAODM allow for greater quantities of oil to be added to the premix without agglomeration.

A variety of additional additives may be used in compositions of this invention. The additives include antioxidants; surface tension modifiers; anti-block agents; lubricants; antimicrobial agents such as organometallics, isothiazolones, organosulfurs and mercaptans; antioxidants such as phenolics, secondary amines, phosphites and thioesters; antistatic agents such as quaternary ammonium compounds, amines, and ethoxylated, propoxylated or glycerol compounds; fillers and reinforcing agents such as carbon black, glass, metal carbonates such as calcium carbonate, metal sulfates such as calcium sulfate, talc, clay or graphite fibers; hydrolytic stabilizers; lubricants such as fatty acids, fatty alcohols, esters, fatty amides, metallic stearates, paraffinic and microcrystalline waxes, silicones and orthophosphoric acid esters; acid neutralizers or halogen scavengers such as zinc oxide; mold release agents such as fine-particle or powdered solids, soaps, waxes, silicones, polyglycols and complex esters such as trimethylol propane tristearate or pentaerythritol tetrastearate; pigments, dyes and colorants; plasticizers such as esters of dibasic acids (or their anhydrides) with monohydric alcohols such as o-phthalates, adipates and benzoates; heat stabilizers such as organotin mercaptides, an octyl ester of thioglycolic acid and a barium or cadmium carboxylate; ultraviolet light stabilizers such as a hindered amine, an o-hydroxyphenylbenzotriazole, a 2-hydroxy-4-alkoxybenzophenone, a salicylate, a cyanoacrylate, a nickel chelate and a benzylidene malonate and oxalanilide; acid-scavengers; and zeolites, molecular sieves and other known deodorizers. A preferred hindered phenolic antioxidant is Irganox™ 1076 antioxidant, available from Ciba Specialty Chemicals. One skilled in the art can readily determine quantities of additives needed based on the application involved.

The TPVs prepared from the EAODMs of this invention are desirably prepared by a variety of processes. A preferred process uses an encapsulated cure system prepared by introducing at least one thermoplastic polymer and a vulcanizing agent or cure activator into a melt mixing device, melt mixing the thermoplastic polymer and vulcanizing agent or cure activator until uniformly mixed, and collecting the encapsulated cure system. If desired, the vulcanizing agent and vulcanizing activator can be separately encapsulated.

The melt mixing device can be any mixing device capable of melting and mixing the thermoplastic polymer with a vulcanizing agent or activator and other additives until an encapsulated cure system in the form of a uniform melt mixture is obtained. The methods of collecting the cure system are well known in the art.

During preparation of the encapsulated cure system, additional additives can be mixed with the thermoplastic polymer and vulcanizing agent or vulcanizing activator. It is not necessary, but preferable, for these additives to be in the melt or liquid state in order to be mixed with thermoplastic polymer and vulcanizing agent or vulcanizing activator. If the additives are in liquid form at room temperature then melting is not required.

The encapsulated cure system is dry blended with an EAODM powder and optionally, additional thermoplastic polymer. The encapsulated cure system can be in pellet or powder form when added. Dry blending is a process known in the art in which any materials which are solids at the dry mixing temperature remain solids during the mixing process. The oils added in these processes must be liquids in order to be imbibed into the EAODM powder. Preferably, the oils added to the EAODM powder are heated to accelerate the imbibing process. If the oil is a solid or waxy material at typical room temperatures, then the oil must be heated to form a free flowing liquid before addition to the EAODM powder. The encapsulated cure system, EAODM, optional additional thermoplastic polymer, oil, and other additives can be added sequentially in any order or simultaneously during the mixing process. For example, before addition to the encapsulated cure system, the EAODM powder can be mixed with oil to obtain a free flowing oil imbibed EAODM powder, followed by dry blending the encapsulated cure system and free flowing oil imbibed EAODM powder until uniformly dry blended. Alternately, a mixture of the encapsulated cure system, EAODM powder and optional additional thermoplastic polymer can be dry blended until uniformly mixed at which point oil is added to the mixture followed by additional dry mixing until the oil has been imbibed into the mixture resulting in a free flowing premix useful for preparing TPVs. The oil can be added by various techniques known to one skilled in the art. Examples of oil addition processes include spraying, pouring, and mixing such as tumble and paddle mixing. If the oil is not heated before addition to the EAODM, the imbibing process is typically less efficient. In an additional variation, additives can be mixed with the oil before the oil is imbibed onto the EAODM powder.

The thermoplastic vulcanizates of this invention are preferably prepared by using dynamic vulcanization techniques, such as those described in Gessler et al., U.S. Pat. No. 3,037,954 and Coran, U.S. Pat. No. 4,130,535 and particular to phenolic cure, Abdou-Sabet, U.S. Pat. No. 4,311,628. The optional additives can be added in the vulcanizer feed or later if not already incorporated into the TPV premix. After sufficient molten-state mixing to form a well mixed blend, the vulcanizing agent or curative, if necessary, are generally added. One can also add the vulcanizing agent or cure activator in solution with a liquid, for example a rubber processing oil that is compatible with the other components. Crosslinking of the rubber can occur in a few minutes or less depending on the mix temperature, shear rate, and activators present for the vulcanizing agent.

A second process variation for preparing TPVs of this invention employs the use of highly oil filled, free flowing, high molecular weight, low odor EAODM powders to prepare TPV premixes. Multiple variations of this process are envisioned and the order of addition of the additives (including partitioning agents), thermoplastic polymer, oil, and vulcanizing agent are not critical as long as the final TPV premix is a free flowing powder or free flowing particles. For example, in one variation the TPV premixes are prepared by dry blending the EAODM powder with at least one thermoplastic polymer and optionally, additional additives, to form a rubber mixture. The rubber mixture is then dry blended with oil or optionally, oil containing additional additives to prepare a TPV premix. Alternatively, the EAODM powder, thermoplastic polymer, oil, and optionally, additional additives are dry blended in a single step to prepare the TPV premix. In a third alternative, the EAODM powder is dry blended with the oil to obtain an oil imbibed free flowing EAODM powder. The oil filled EAODM powder is subsequently dry blended with at least one thermoplastic polymer to prepare the TPV premix. The vulcanizing agent(s) and/or cure activator in this process variation is not encapsulated in the TPV premix. Accordingly, the vulcanizing agent or cure activator, and optionally additional additives, can be added to the EAODM during the dry blending with the thermoplastic powder or added to the oil before the oil is added to the rubber mixture or added with the premix into the melt mixer. If the vulcanizing agent requires a cure activator the activator can be added along with the thermoplastic polymer or oil so that both the vulcanizing agent and curative are contained in the TPV premix or the cure activator may be added along with the TPV premix into the melt mixing device.

More specifically, the TPV premix, and optionally other ingredients such as cure activator and additives are added to a melt mixing device. The TPV premix and any optional additives are melt mixed or extruded under conditions similar to those employed in the TPV premix containing the encapsulated cure system.

A third process variation for preparing TPVs of this invention requires the vulcanizing agent and/or cure activator be added downstream in the melt mixing device. Downstream is defined as addition anywhere during the melt processing or dynamic vulcanization of the EAODM mixture except the very beginning of the process. For example, when an extruder is used to perform the dynamic vulcanization, the desired ingredients are added in the extruder throat (beginning) and any additives not added in the throat are added later in the process or downstream of the extruder throat. When such a variation is employed and the vulcanizing agent does not require a cure activator, the TPV premix will not contain any vulcanizing agent. If the vulcanizing agent requires a cure activator, the vulcanizing agent or cure activator can be added to the TPV premix with the remaining cure component added downstream or both the vulcanizing agent and cure activator can be added downstream. Addition of the cure activator can occur before the addition of the vulcanizing agent, during the addition of the vulcanizing agent, or after the addition of the vulcanizing agent.

A fourth process variation involves addition of the EAODM, thermoplastic polymer, vulcanizing agent, and optionally, other additives at the beginning or entrance point of the melt mixing device. Before the EAODM has lost its particle or powder shape (i.e., before melting), hot oil, optionally containing additional additives, is fed into the mixture resulting in an oil imbibed EAODM mixture.

Suitable mixing devices for all the process variations of the invention include Banbury® mixers, Brabender mixers and certain mixing extruders such as co-rotating, counter-rotating, single screw and twin-screw extruders, ring extruders, and planetary extruders, as well as co-kneaders. Preferably, single and twin extruders, optionally containing vent port(s) to remove volatiles, are used to prepare the TPVs of this invention. If extruding, the extrudate can be cooled and chopped, pelletized, ground into a powder, or collected in crumb form. Other collection methods include collecting the mixture, chopping the mixture, and cooling the mixture by immersing in water.

As stated previously, the thermoplastic vulcanizates of this invention are preferably prepared by using dynamic vulcanization techniques. Dynamic vulcanization is a process whereby at least one rubber is crosslinked within a blend that includes the rubber and at least one non-vulcanizing polymer, i.e., thermoplastic polymer, while both polymers are undergoing mixing or masticating at some elevated temperature; the mixing or masticating continues until a desired vulcanization is achieved.

Suitable curing temperatures for the TPV are well known to one skilled in the art. Suitable curing temperatures depend on the thermoplastic polymer and vulcanizing agent and/or activator, but typically the range is from 80° C. to 300° C. For example, when PP homopolymer is used as the thermoplastic polymer and the curative is a phenolic resin, a curing temperature of 170° C. to 270° C. is preferred, with 190° C. to 250° C. being more preferred. Heating and masticating at these vulcanization temperatures are generally adequate to complete the vulcanization reaction in a few minutes or less, but if shorter vulcanization times are desired, higher temperatures may be used. Alternatively, a vulcanizing agent can be selected which has the appropriate half-life to complete the vulcanization in the desired time frame. To obtain thermoplastic vulcanizates, it is important that mixing continues without interruptions until substantial vulcanization occurs. The progress of the vulcanization may be followed by monitoring mixing torque or mixing energy requirements during mixing. The mixing torque or mixing energy curve generally goes through a maximum after which mixing can be continued somewhat longer to improve the elastic properties of the blend. If desired, one can add additional ingredients, such as a stabilizer package, processing aid, oil, plasticizer, or additional thermoplastic polymer after the dynamic vulcanization is complete.

When an extruder is used to prepare the TPV, and additional oil is added, the oil is preferably added from a port provided in the melt mixing device using a gear pump or the like. Moreover, additional additives or materials, including other resins and elastomers, may be added by a side feeder on the melt mixing device or the like.

After discharge from the mixing device, the TPV can be milled, chopped, extruded, pelletized, injection molded, or processed by any other desirable technique.

The thermoplastic vulcanizates of this invention include a cured EAODM and a thermoplastic polymer. Preferably, the thermoplastic vulcanizate is a homogeneous mixture, wherein the EAODM is in the form of finely-divided and well-dispersed rubber particles within a non-vulcanized matrix. It should be understood, however, that the thermoplastic vulcanizates of this invention are not limited to those containing discrete phases, inasmuch as the compositions of this invention may also include other morphologies, such as co-continuous morphologies. In especially preferred embodiments, the rubber particles have an average particle size smaller than about 50 μm, more preferably smaller than about 25 μm, even more preferably smaller than about 10 μm or less, and still more preferably smaller than about 5 μm.

The thermoplastic vulcanizates of this invention are useful for making a variety of articles such as weather seals, hoses, belts, gaskets, moldings, boots, elastic fibers and like articles. They are particularly useful for making articles by blow molding, extrusion, injection molding, thermo-forming, elasto-welding and compression molding techniques. More specifically, the articles of the invention are particularly useful for making vehicle parts, such as but not limited to, weather seals, brake parts including, but not limited to cups, coupling disks, diaphragm cups, boots such as constant velocity joints and rack and pinion joints, tubing, sealing gaskets, parts of hydraulically or pneumatically operated apparatus, o-rings, pistons, valves, valve seats, valve guides, and other elastomeric polymer based parts or elastomeric polymers combined with other materials such as metal, plastic combination materials which will be known to those of ordinary skill in the art. Also contemplated are transmission belts including V-belts, toothed belts with truncated ribs containing fabric faced V's, ground short fiber reinforced Vs or molded gum with short fiber flocked V's. The cross section of such belts and their number of ribs may vary with the final use of the belt, the type of market and the power to transmit. They also can be flat made of textile fabric reinforcement with frictioned outside faces. Vehicles contemplated where these parts will find application include, but are not limited to passenger autos, motorcycles, trucks, boats and other vehicular conveyances.

The following examples demonstrate the practice of the present invention. The examples should not, however, be viewed as limiting the scope of the invention.

EXAMPLES

All dry mixing procedures were conducted using a KitchenAid mixer (Model KSM103WW) at lowest r.p.m. setting and a batter beater mixing accessory.

Mooney viscosity was measured on the EPDM containing the partitioning agent (essentially as it exits the gas phase process). From this measured Mooney a calculated Mooney was determined for the "neat" or pure polymer without the partitioning agent.

The term "phr" is pounds per hundred pounds EAODM polymer, (EAODM without partitioning agent)

The following oils were used in the Examples of the invention:

Sunpar 110—(365 nominal MW)
Sunpar 150—(517 nominal MW)
Sunpar 2280—(690 nominal MW)

The EAODM used in Oil Imbibing Examples was a metallocene catalyzed particulate EPDM made in a gas phase process, containing 37 phr carbon black as process partitioning agent. The EPDM was comprised of 67 wt % ethylene, 29 wt % propylene and 4% ENB and had a calculated Mooney viscosity of 130 (EPDM-1).

It is desirable that the oil imbibe fully into the particles to avoid sticking during handling or storage, or slippage during subsequent processing. It is known that increasing the oil temperature increases the rate of permeation into hydrocarbon polymers. We have found that there is a relationship between the temperature and viscosity of the oil, and between the temperature or viscosity of the oil and the rate of imbibing into the EPDM particles. Since there is a practical lower limit to viscosity (or oil MW) in applications such as automotive interiors where volatility of low MW oils causes undesirable effects (such as condensation on automobile windshields), a trade-off between oil MW and temperature of oil addition may be necessary. The following Oil Imbibing Examples and Tables show the relationship between imbibing rate and oil viscosity grade and oil temperature (at the time of addition to the EPDM).

Oil Imbibing Examples

EPDM and 75 phr oil were mixed for 30 seconds in a KitchenAid mixer at lowest r.p.m. setting, then dumped into a 6"×10" aluminum pan with ½" sides and allowed to rest for various times. Periodically, small aliquots (approx. ½ teaspoon) were removed and manually rolled back and forth 6 times (6 times each direction) using the flat of a plastic knife on a piece of standard xerographic paper (Corporate Express EXP8511 white 20 lb., 84 brightness). The appearance of the paper was judged and a rating of 0-5 assigned, with "5" indicating very poor oil absorption and "0" complete oil absorption. To minimize subjectivity, a "standard" sheet containing markings of materials rated "0" through "5" was used as a comparative standard when judging all samples. The appearance was carefully rated according to the following rating system:
  5. Large amounts of oil soaked into the paper; translucent in large areas when viewed from the back side of the paper.
  4. Oil halos are smaller and more individual particle tracks (from the rolling action) and halos are observed. Less total oil soaked in, especially when viewed from the back side of the paper.
  3. Very few small oil halos, if any, from the back side. From the front side, particle tracks are more individual.
  2. No oil halos. Some smearing of particles; less marking on the paper except where particles smeared.
  1. Very light particle tracks.
  0. No marking.

If oil was deposited on the paper to the extent that it heavily bled through to the back side of the sheet of paper, a rating of "4" or "5" was assigned based on the appearance of the back side of the sheet of paper. If bleed-through was non-existent or very spotty, the rating was assigned based on the appearance of the front side of the paper.

Particles that had thoroughly absorbed the oil to the point of "dryness" thus received a "0" rating, though "1" was also very dry and "2" was quite dry as well. Particles that were rated "0" through "2" were generally free-flowing, though deagglomeration may be required especially in the case of those particles that were imbibed at high temperatures. Particles rated "3" were marginal in their free-flowing character. Particles rated "4" or "5" were generally not free-flowing unless there was simply so much oil on the surface that the mixture flowed as a lubricated mass of particles. This is not the "dry" free-flowing state that is the subject of this invention, and particles coated with free oil are prone to slippage in mixing equipment, or if stored, may mass more severely than particles that are already dry.

In these examples, oil was preheated to temperatures between room temperature (approx. 23° C.) and 220° C. Room temperature EPDM was mixed in the KitchenAid mixer, then, while it was mixing, oil was added according to the above procedure, and after dumping into the pan, the "dryness" of the particles rated over time. The following examples show the effect of various initial oil temperatures and grades of oil (Sunpar 110 vs. 150 vs. 2280). The table shows the time from when the mixture was dumped from the mixer into the pan (e.g., time=0 was 30-45 seconds after the oil was added to the mixing EPDM particles in the KitchenAid mixer). The table shows the faster imbibing rate with either higher temperature or lower viscosity grade oils. A combination of high temperature and low viscosity grade oil (Sunpar 110<150<2280) resulted in the fastest imbibing rate. Also shown are results for two older technology gas phase EPDM's (Mega 7265 and Mega 9315, formerly available from Union Carbide Corp.) not made using metallocene catalyst. The superior imbibing characteristics of metallocene gas phase EPDM's are evident.

| Time (minutes) | EPDM-1/75 phr Sunpar 110 @ room temperature | Time (minutes) | EPDM-1/75 phr Sunpar 110 @ 100 C. | Time (minutes) | EPDM-1/75 phr Sunpar 110 @ 175 C. | Time (minutes) | EPDM-1/75 phr Sunpar 110 @ 220 C. |
|---|---|---|---|---|---|---|---|
| 0 | 5 | 0 | 4 | 0 | 3 | 0 | 2 |
| 3 | 4 | 1 | 4 | 1 | 2 | 1 | 1 |
| 8 | 3 | 1.5 | 3 | 1.5 | 2 | 1.5 | 1 |
| 10 | 2 | 2 | 3 | 2 | 1 | 2 | 1 |
| 15 | 1 | 2.5 | 2 | 2.5 | 1 | 2.5 | 1 |
| 24 | 0 | 3 | 2 | 3 | 1 | 3 | 1 |
|  |  | 3.5 | 2 | 3.5 | 1 | 3.5 | 1 |
|  |  | 4 | 2 | 4 | 1 | 4 | 1 |
|  |  | 4.5 | 1 | 4.5 | 1 | 4.5 | 0 |
|  |  | 5 | 1 | 5 | 0 |  |  |
|  |  | 5.5 | 1 |  |  |  |  |
|  |  | 6 | 1 |  |  |  |  |
|  |  | 6.5 | 1 |  |  |  |  |
|  |  | 7.5 | 1 |  |  |  |  |
|  |  | 8 | 0 |  |  |  |  |
|  |  | 8.5 |  |  |  |  |  |

-continued

| Time (minutes) | EPDM-1/75 phr Sunpar 150 @ room temperature | Time (minutes) | EPDM-1/75 phr Sunpar 150 @ 100 C. | Time (minutes) | EPDM-1/75 phr Sunpar 150 @ 175 C. | Time (minutes) | EPDM-1/75 phr Sunpar 150 @ 220 C. |
|---|---|---|---|---|---|---|---|
| 0 | 5 | 0 | 5 | 0 | 5 | 0 | 3 |
| 1 | 5 | 1 | 5 | 0.5 | 4 | 0.5 | 3 |
| 2 | 4 | 2 | 4 | 1 | 3 | 1 | 2 |
| 4 | 4 | 4 | 4 | 1.5 | 3 | 1.5 | 3 |
| 6 | 4 | 8 | 3 | 2 | 3 | 2 | 2 |
| 10 | 4 | 12 | 3 | 3.5 | 2 | 2.5 | 1 |
| 15 | 4 | 16 | 2 | 4.5 | 1 | 3 | 2 |
| 21 | 4 | 20 | 2 | 5 | 1 | 3.5 | 1 |
| 25 | 4 | 25 | 2 | 6 | 1 | 4 | 1 |
| 30 | 3 | 35 | 1 | 7 | 1 | 4.5 | 1 |
| 35 | 3 | 46 | 1 | 8 | 1 | 5 | 1 |
| 45 | 2 | 63 | 1 | 9 | 1 | 5.5 | 0 |
| 60 | 2 | 70 | 0 | 10 | 1 | | |
| 80 | 1 | | | 15 | 0 | | |
| 90 | 0 | | | | | | |

| Time (minutes) | EPDM-1/75 phr Sunpar 2280 @ room temperature | Time (minutes) | EPDM-1/75 phr Sunpar 2280 @ 100 C. | Time (minutes) | EPDM-1/75 phr Sunpar 2280 @ 175 C. | Time (minutes) | EPDM-1/75 phr Sunpar 2280 @ 220 C. |
|---|---|---|---|---|---|---|---|
| 0 | 5 | 0 | 5 | 0 | 5 | 0 | 5 |
| 5 | 5 | 1 | 5 | 1 | 5 | 0.5 | 4 |
| 15 | 5 | 3 | 4 | 3 | 4 | 2 | 3 |
| 30 | 4 | 5 | 4 | 5 | 3 | 3 | 3 |
| 45 | 4 | 15 | 3 | 7 | 3 | 5 | 2 |
| 62 | 3 | 30 | 2 | 10 | 3 | 6 | 2 |
| 90 | 3 | 45 | 2 | 15 | 2 | 7 | 2 |
| 120 | 3 | 60 | 2 | 28 | 1 | 8 | 2 |
| 150 | 3 | 65 | 2 | 40 | 1 | 9 | 2 |
| 180 | 2 | 140 | 1 | 60 | 0 | 10 | 1 |
| 270 | 1 | 180 | 1 | | | 11 | 1 |
| 300 | 1 | 210 | 0 | | | 12 | 1 |
| 360 | 1 | | | | | 14 | 1 |
| 420 | 0 | | | | | 15 | 1 |
| | | | | | | 16 | 1 |
| | | | | | | 17 | 1 |
| | | | | | | 18 | 1 |
| | | | | | | 20 | 1 |
| | | | | | | 22 | 1 |
| | | | | | | 25 | 1 |
| | | | | | | 30 | 0 |

| Time (minutes) | Mega 7265/75 phr Sunpar 150 @ room temperature | Time (minutes) | Mega 7265/75 phr Sunpar 150 @ 175 C. | Time (minutes) | Mega 9315/75 phr Sunpar 150 @ room temperature | Time (minutes) | Mega 9315/75 phr Sunpar 150 @ 175 C. |
|---|---|---|---|---|---|---|---|
| 0 | 5 | 0 | 5 | 0 | 5 | 0 | 5 |
| 0.5 | 5 | 0.5 | 5 | 1 | 5 | 1 | 5 |
| 5 | 5 | 5 | 5 | 10 | 5 | 10 | 5 |
| 10 | 5 | 15 | 5 | 30 | 5 | 30 | 5 |
| 20 | 5 | 20 | 4 | 60 | 5 | 60 | 4 |
| 90 | 5 | 30 | 5 | 150 | 5 | 150 | 3 |
| 150 | 5 | 60 | 4 | 240 | 4 | 240 | 3 |
| 180 | 5 | 107 | 3 | 450 | 3 | 450 | 2 |
| 240 | 5 | 120 | 2 | 570 | 3 | 570 | 2 |
| 300 | 5 | 150 | 5 | 780 | 2 | 780 | 2 |
| 360 | 5 | 180 | 2 | 1200 | 1 | 1200 | 1 |
| 1200 | 4 | 210 | 2 | 1950 | 1 | 1950 | 1 |
| 1560 | 4 | 1020 | 0 | 2580 | 0 | 2580 | 1 |
| 5760 | 3 | | | | | | |
| 7200 | 2 | | | | | | |
| 8640 | 1 | | | | | | |
| 10080 | 1 | | | | | | |
| 12960 | 0 | | | | | | |

For metallocene EPDM, the time to reach a rating of "1" (from an initial rating of "5") is summarized in the following table:

| | Time (min.) to reach rating of 1 | | | |
|---|---|---|---|---|
| | Temp (° C.) | | | |
| Oil | 23 | 100 | 175 | 220 |
| Sunpar 110 | 15 | 4.5 | 2 | 1 |
| Sunpar 150 | 80 | 35 | 4.5 | 2.5 |
| Sunpar 2280 | 270 | 140 | 28 | 10 |

The data in the above tables clearly show that metallocene gas phase EPDM was superior to non-metallocene gas phase EPDM in its imbibing rate/oil absorption characteristics.

If the data are graphed as Imbibing Rating vs. Square Root Time (with time in minutes), the data can be fit according to a linear relation whose slope is −k, where k is defined as the imbibing rate constant. When the intercept of the line at zero time is forced to a rating of "5", the rate constants k shown in the following table are obtained. Also shown in the table are viscosities of the various oil grades at each temperature. These viscosities were from a linear regression of natural logarithm viscosity vs. reciprocal absolute temperature data (collection of viscosity data is described below); data for Sunpar 150 and 2280 were extrapolated to room temperature since the viscosity was too high at room temperature for direct measurement with the r.p.m. and spindle used. A graph of ln(viscosity) vs. ln(k) is shown in the following figure. This figure shows that oil viscosity is a key parameter for imbibing rate, whether obtained via manipulation of oil MW or oil temperature. Furthermore, the non-metallocene EPDM's are shown to have much lower imbibing rates for a given oil viscosity than metallocene EPDM.

Determination of Oil Viscosities in a Brookfield Viscometer:

A Brookfield digital viscometer model DV-11+ version 5.0 with thermosel accessory was used to collect viscosity data. A program was written in DV Loader to enable the collecting of torque and viscosity values as an oil sample was heated from room temperature to 220 C, collecting data every 10 seconds. The data were collected using Brookfield Wingather software. Each sample was loaded as described in the Brookfield DV11+ programmable viscometer operating instruction manual #M/97-164-A698. Spindle SC4-21 was used at 200 r.p.m. for all samples tested.

given imbibing rate; heating oil to high temperatures may lead to degradation of the oil. High imbibing rates allow processes such as "in situ dry blending" of oil and particles in the first flights of an extruder or mixing device while the EPDM is still in particle form, whereas particles with slow imbibing rates remain coated with free oil and therefore may slip in the extruder and not mix or extrude properly.

The following figure illustrates the time until an Imbibing Rating of "1" was achieved in metallocene EPDM as a function of viscosity. To achieve rapid imbibing times and achievement of very "dry" free-flowing particles, an oil viscosity equal to or less than 50 cP is preferred, and more preferably equal to or less than 10 cP. The viscosity can be obtained by varying oil molecular weight or oil temperature. Polymer temperature may also be controlled to affect oil temperature by heat transfer, though this method is less preferred.

The high MW EPDM in Example 1 was prepared in a gas phase fluidized bed process using a metallocene catalyst. The EPDM sample had a calculated polymer Mooney viscosity of approximately 156 and comprising 69% ethylene, 26% propylene, 5.1% ENB and 31% carbon black.

The formulation in the following Table was used for Example 1.

| Ingredient | PHR (relative to EPDM polymer) |
|---|---|
| EPDM-2 (~156 MV) | 100 |
| polypropylene (PD191)[1] | 57 |
| carbon black (in the EDPM) | 27 |
| Sunpar 2280 | 75 |
| Irganox 1076[2] | 0.7 |
| Zinc oxide | 2 |
| SP1045 phenolic resin | 10 |
| stannous chloride dihydrate | 1.7 |
| Oxidized polyethylene wax (AC629C) | 2 |

[1]Polypropylene PD191 is a 0.7 MFR homopolymer from Basell
[2]Irganox 1076 is a hindered phenolic antioxidant from Ciba Specialty Chemicals The oil was heated on a hot plate to 95° C. The phenolic resin was stirred into the oil for approximately 10 min until

| | Oil | Temp | Viscosity (cP) | Time to Rating = 1 | ln(Viscosity) | k (from fitted Eqn) | ln(k) |
|---|---|---|---|---|---|---|---|
| EPDM-1 | 110 | 23 | 40.41854 | 15 | 3.699288706 | 0.9477 | −0.05371728 |
| | 110 | 100 | 6.085333 | 4.5 | 1.805881525 | 1.6485 | 0.499865784 |
| | 110 | 175 | 1.799257 | 2 | 0.587373889 | 2.2494 | 0.810663514 |
| | 110 | 220 | 1.034818 | 1 | 0.034225798 | 2.4499 | 0.896047207 |
| | 150 | 23 | 332.0098 | 80 | 5.805164372 | 0.4053 | −0.90312775 |
| | 150 | 100 | 22.35727 | 35 | 3.107151547 | 0.5986 | −0.51316168 |
| | 150 | 175 | 3.938648 | 4.5 | 1.370837634 | 1.4621 | 0.379873758 |
| | 150 | 220 | 1.790739 | 2.5 | 0.582628601 | 2.0384 | 0.712165186 |
| | 2280 | 23 | 2121.532 | 270 | 7.659893538 | 0.2183 | −1.52188502 |
| | 2280 | 100 | 81.78465 | 140 | 4.404089611 | 0.357 | −1.0300195 |
| | 2280 | 175 | 10.06242 | 28 | 2.308807631 | 0.6783 | −0.38816561 |
| | 2280 | 220 | 3.887021 | 10 | 1.357643113 | 0.9988 | −0.00120072 |
| Mega 7265 | 150 | 23 | 332.0098 | 8640 | 5.805164372 | 0.0374 | −3.28608457 |
| | 150 | 175 | 3.938648 | >210 | 1.370837634 | 0.1612 | −1.82510945 |
| Mega 9315 | 150 | 23 | 332.0098 | 1200 | 5.805164372 | 0.0946 | −2.3580978 |
| | 150 | 175 | 3.938648 | 1200 | 1.370837634 | 0.0998 | −2.3045871 |

Polymer particles with high oil imbibing rates are desirable because oil doesn't have to be heated as much to achieve a dissolved. Polypropylene was cryoground on a ZM-1 ultra-centrifugal mill (Brinkmann-Retsch) (using a 4 mm sieve ring and 24 tooth rotor and liquid nitrogen as cryogen) to facilitate laboratory scale extrusion. The EPDM, PP, Irganox 1076, ZnO, oxidized polyethylene wax and stannous chloride dihydrate were added to the KitchenAid mixing bowl and mixed with a batter beater at lowest rpm setting for approximately 15 seconds followed by addition of the hot oil/phenolic mixture and mixed for approximately 30 seconds. The resulting TPV premix was placed into a covered metal pan and stored at ambient temperature for four days, during which time it agglomerated. The TPV premix was removed, placed into a Waring blender, blended at high speed until fluidized (approximately 15 seconds), then removed. This TPV premix was dry and free-flowing, and remained unagglomerated even after one month of ambient storage.

The TPV premix was fed at an approximately constant rate to the feed throat of a Leistritz Micro 18 twin screw extruder and extruded at 200 rpm and 250° C. (140° C. on the feedthroat zone, 250° C. on the rest of the extruder and die zones) into a water bath. The extruded TPV was granulated in a pelletizer/strand chopper. The TPV was roll-milled on a Reliable roll mill at 190° C. nominal temperature for 10 passes, sheeted off, then compression molded at 190° C. for 2 minutes at 1000 psi pressure followed by 4 minutes at 30,000 psi, then cooled in chilled platens at 30,000 psi for 4 minutes. Tensile specimens were cut (aligned with the mill direction) and deformed at 5 inches/minute. Shore A hardness was determined after 5 seconds. Results are shown in the following Table.

| Property | Value |
| --- | --- |
| Shore A Hardness | 80 |
| Tensile stress at break (psi) | 1926 |
| Elongation at break (%) | 556 |

Example 2 and Comparative Example A

The high MW EPDM used in Example 2 was prepared in a gas phase fluidized bed pilot plant using a metallocene catalyst. The EPDM sample had a calculated polymer Mooney viscosity of approximately 200 Mooney units. The EPDM was 64% ethylene, 31% propylene, 5.3% ENB and 36% carbon black. Polypropylene was a nominal 4 MFI homopolymer reactor sample from a gas phase plant, in powder form.

The formulation in the following Table was used for Example 2.

| Ingredient | PHR (relative to EPDM polymer) |
| --- | --- |
| EPDM-3 (~200 MV) | 100 |
| polypropylene (RX-1 2P) | 50 |
| carbon black (in the EDPM) | ~32 |
| Sunpar 2280 | 130 |
| Irganox 1076 | 1 |
| Zinc oxide | 2 |
| SP1045 phenolic resin | 10 |
| stannous chloride dihydrate | 1.7 |

Example 2

All ingredients except the phenolic curative and stannous chloride dihydrate were added to the KitchenAid mixer at ambient temperature (about 23 C) and mixed until evenly distributed (<60 seconds), using the KitchenAid mixer with batter blade at lowest rpm setting. The mixture was immediately added to a Haake Rheomix 3000 mixing bowl with roller style blades and mixed at 30 rpm and 190° C. for approximately 3 minutes, then the rotor speed was increased to 75 rpm and processing continued for an additional 5 minutes. The curatives (SP1045 and stannous chloride dihydrate) were added, and mixing was continued at 75 rpm until the torque leveled off (approximately 3 minutes). The resulting TPV was roll-milled on a Reliable roll mill at 190° C. nominal temperature for 10 passes, sheeted off, then compression molded at 190° C. for 2 minutes at 1000 psi pressure followed by 4 minutes at 30,000 psi, then cooled in chilled platens at 30,000 psi for 4 minutes. Tensile specimens were cut (aligned with the mill direction) and deformed at 5 inches/minute. Shore A hardness was determined after 5 seconds.

Comparative Example A

The recipe was the same as for Example 2. EPDM, PP and Irganox 1076 were added to a Haake Rheomix 3000 mixing bowl with roller style blades and mixed at 30 rpm and 190° C. for 1 minute. Approximately 95° C. heated oil (Sunpar 2280) was added carefully over the course of approximately 11 minutes and 30 rpm to avoid slippage and loss of mixing. Following completion of oil addition, zinc oxide was added and mixed for 1 minute at 30 rpm. Then the rotor speed was increased to 75 rpm and mixing was continued for 5 minutes. Then the curatives (SP1045 and stannous chloride dihydrate) were added, then mixing was continued at 75 rpm until the torque leveled off (approximately 3 minutes). The product was roll-milled on a Reliable roll mill at 190° C. nominal temperature for 10 passes, sheeted off, then compression molded at 190° C. for 2 minutes at 1000 psi pressure followed by 4 minutes at 30,000 psi, then cooled in chilled platens at 30,000 psi for 4 minutes. Tensile specimens were cut (aligned with the mill direction) and deformed at 5 inches/minute. Shore A hardness was determined after 5 seconds.

Results are shown in the following table. These results show that compared to a TPV process in which oil is added to a melt blend of polymers and other ingredients and mixed prior to adding curatives, a process in which the oil is dry blended with metallocene-catalyzed gas phase EPDM prior to melt mixing and then melt mixed and then curatives are added and dynamically vulcanized resulted in higher elongation.

| Property | Example 2 | Comparative Example A |
| --- | --- | --- |
| Shore A Hardness | 62 | 68 |
| Tensile stress at break (psi) | 1136 | 1042 |
| Elongation at break | 531 | 447 |
| Compression Set (22 h/70 C.)* | 39 | 34 |
| Compression Set (70 h/100 C.)* | 42 | 43 |

*ASTM D395, Method B, Type 1 specimens, compression molded thick specimens

Examples 3-5

The high MW EPDM used in Example 3 and Comparative Examples B and C was the same as for Example 2. Polypropylene was PD191 (a nominal 0.7 MFI homopolymer in pelletized form). Except for the PP, the formulation was identical to that used in Examples 1-2

Example 3

EPDM and oil were stirred together using a KitchenAid mixer with batter beater at lowest rpm setting for approximately 30 seconds. The mixture was immediately added to a Haake Rheomix 3000 mixing bowl with roller style blades and mixed at 30 rpm and 190° C. until loaded, then rotor speed was increased to 75 rpm and mixed for approximately 2 minutes to achieve a stable torque. Rotor speed was decreased to 30 rpm and polypropylene, Irganox 1076 and ZnO added and rotor speed was increased to 75 rpm for 1.5 minutes. Rotor speed was then increased to 150 rpm for an additional 5 minutes at which time the rpm was reduced to 75 and the curatives (SP1045 and stannous chloride dihydrate) were added, followed immediately by raising the rotor speed to 150 rpm for 5 minutes. The TPV product was roll-milled on a Reliable roll mill at 190° C. nominal temperature for 10 passes, sheeted off, then compression molded at 190° C. for 2 minutes at 1000 psi pressure followed by 4 minutes at 30,000 psi, then cooled in chilled platens at 30,000 psi for 4 minutes. Tensile specimens were cut (aligned with the mill direction) and deformed at 5 inches/minute. Shore A hardness was determined after 5 seconds.

Comparative Example B

Sunpar 2280 oil was heated to approximately 95° C. and the SP1045 was added to the hot oil and dissolved with stirring. All the other ingredients except the stannous chloride were mixed together using a KitchenAid mixer with batter beater at lowest rpm setting for approximately 15 seconds. Then the hot oil/SP1045 solution was dribbled in while the mixer was running; once all the oil was in, mixing was continued for approximately 30 seconds. Approximately 220 g of this mixture was immediately added to a Haake Rheomix 3000 mixing bowl with roller style blades and mixed at 30 rpm and 190° C. until loaded, then rotor speed was increased to 150 rpm and mixed for an additional 5 minutes. The rpm was reduced to 75 as the cure activator (stannous chloride dihydrate) was added, then raised to 150 rpm and mixing was continued at 150 rpm for 5 minutes. The product was roll-milled on a Reliable roll mill at 190° C. nominal temperature for 10 passes, sheeted off, then compression molded at 190° C. for 2 minutes at 1000 psi pressure followed by 4 minutes at 30,000 psi, then cooled in chilled platens at 30,000 psi for 4 minutes. Tensile specimens were cut (aligned with the mill direction) and deformed at 5 inches/minute. Shore A hardness was determined after 5 seconds.

Comparative Example C

EPDM, PP and Irganox 1076 were added to a Haake Rheomix 3000 mixing bowl with roller style blades and mixed at 30 rpm and 190° C. for 1 minute. Approximately 95° C. heated oil (Sunpar 2280) was added carefully over the course of approximately 8 minutes and 30 rpm to avoid slippage and loss of mixing. Following completion of oil addition, zinc oxide was added and mixed for 1 minute at 30 rpm. Then the rotor speed was increased to 75 rpm and mixing was continued for 5 minutes. Then the curatives (SP1045 and stannous chloride dihydrate) were added, then mixing was continued at 75 rpm until the torque leveled off (approximately 3 minutes). The product was roll-milled on a Reliable roll mill at 190° C. nominal temperature for 10 passes, sheeted off, then compression molded at 190° C. for 2 minutes at 1000 psi pressure followed by 4 minutes at 30,000 psi, then cooled in chilled platens at 30,000 psi for 4 minutes. Tensile specimens were cut (aligned with the mill direction) and deformed at 5 inches/minute. Shore A hardness was determined after 5 seconds.

The following table shows that the inventive process produces TPV's with significantly higher tensile elongation than either comparative example.

| Property | Example 3 | Example B | Example C |
|---|---|---|---|
| Shore A Hardness | 61 | 64 | 70 |
| Tensile stress at break (psi) | 1360 | 1028 | 1458 |
| Elongation at break | 743 | 402 | 460 |
| Compression Set* (22 h/70 C.) | 45 | 33 | 30 |
| Compression Set* (70 h/100 C.) | 44 | 38 | 34 |

*ASTM D395, Method B, Type 1 specimens, compression molded thick specimens.

Example 4-10 and Comparative Examples D-J

The EPDM used in Examples 4-10 and Comparative Examples D-J is the same as in Example 1. The following table shows the formulation used.

In all examples, polypropylene was cryoground on Retsch ZM-1 grinder to facilitate laboratory scale extrusion on a small extruder and to simulate the size of granules available from gas phase polypropylene reactors.

| Ingredient | PHR (relative to EPDM polymer) |
|---|---|
| EPDM-4 (~156 MV) | 100 |
| polypropylene (PD191) | 57 |
| carbon black (in the EDPM) | 27 |
| Sunpar 2280 | 75 |
| Irganox 1076 | 0.7 |
| Zinc oxide | 2 |
| SP1045 phenolic resin | 10 |
| stannous chloride dihydrate | 1.7 |
| Oxidized polyethylene wax (AC629C) | 2 |

Preparation of Encapsulated Cure Activator System

Polypropylene (200 g) was melted in a Haake Rheomix 3000 mixing bowl with roller style blades for approximately 2 minutes at 30 rpm and 190° C. followed by addition of 47.6 g zinc oxide and mixing continued for 2 additional minutes. Stannous chloride dihydrate (40 g) was added to the mixture (approximately 1.5 minutes addition time), rotor speed was then increased to 75 rpm and mixing continued for 5 minutes. The encapsulated vulcanization activator was removed, flatted between Mylar sheets for approximately 1 minute at 30,000 psi in a compression molding machine and the sheet cut into strips and chopped using scissors, then cryoground on a Retsch ZM-1 grinder using a 4 mm sieve ring and 24 tooth rotor and liquid nitrogen as cryogen resulting in a free flowing encapsulated vulcanization activator powder.

Preparation of Preblends for Invention

Oil was heated in a glass beaker on a hot plate to approximately 95° C. Phenolic resin curative was stirred into the heated oil and melted/dissolved. To a KitchenAid mixing bowl was added the EPDM, encapsulated cure activator, remaining cryoground PP (that not already in the encapsulated cure activator), Irganox 1076 and oxidized polyethylene wax and mixed with the batter beater at lowest rpm setting for approximately 15 seconds followed by addition of the hot oil/phenolic mixture and mixing continued for an additional 30 seconds. The oil filled EPDM mixture was placed into a covered metal pan and stored at ambient temperature for two days, during which it became fully imbibed (dry) but also agglomerated. The mixture was removed, divided into portions that were approximately ⅓ the volume of a Waring blender container, and each portion was placed into a Waring blender, blended at high speed until fluidized (approximately 15 seconds), then removed to provide 1022 g of Preblend 1 (44.5 g activator) as a dry and free flowing oil filled EPDM mixture.

Preparation of Preblends for Comparative Examples

Oil was heated in a glass beaker on a hot plate to approximately 95° C. Phenolic resin curative was stirred into the oil and melted/dissolved. To a KitchenAid mixing bowl was added the EPDM, cryoground PP, ZnO, Irganox 1076, stannous chloride dihydrate, and oxidized polyethylene wax and mixed with the batter beater at lowest rpm setting for approximately 15 seconds followed by addition of the hot oil/phenolic mixture and mixing continued for an additional 30 seconds. This mixture was placed into a covered metal pan and stored at ambient temperature for four days, during which time it agglomerated. The mixture was removed, divided into portions that were approximately ⅓ the volume of a Waring blender container, and each portion was placed into a Waring blender, blended at high speed until fluidized (approximately 15 seconds), then removed to provide Preblend A as a dry free-flowing powder.

Twin Screw Extrusion Examples 4-7

Preblend 1 was fed (at a feed rate intended to achieve approximately constant torque) to the feed throat of a Leistritz Micro 18 twin screw extruder and extruded at 100 or 200 rpm and 200 or 250° C. (140° C. on the feedthroat zone, 200 or 250° C. on the rest of the extruder and die zones) into a water bath. It was subsequently granulated in a pelletizer/strand chopper. Output rate is shown in the table of results. Granulated product was roll-milled on a Reliable roll mill at 190° C. nominal temperature for 10 passes, sheeted off, then compression molded at 190° C. for 2 minutes at 1000 psi pressure followed by 4 minutes at 30,000 psi, then cooled in chilled platens at 30,000 psi for 4 minutes. Tensile specimens were cut (aligned with the mill direction) and deformed at 5 inches/minute. Shore A hardness was determined after 5 seconds.

Twin Screw Extrusion Comparative Examples D-G

The comparative examples were extruded using the same conditions as for Examples 4-7 using Preblend A.

The following table shows the TPV's made using the encapsulated cure activator system yielded higher tensile strength and elongation than those made without cure encapsulation.

| Property | Ex. 1 | Ex. 2 | Ex. 3 | Ex. 4 | Comp. Ex. D | Comp. Ex. E | Comp. Ex. F | Comp. Ex. G |
|---|---|---|---|---|---|---|---|---|
| Temp (° C.) | 200 | 200 | 250 | 250 | 200 | 200 | 250 | 250 |
| Screw Speed (rpm) | 100 | 200 | 200 | 100 | 100 | 200 | 100 | 200 |
| Output Rate (kg/hr) | 2.5 | 3.6 | 4.0 | 0.8 | 1.2 | 1.6 | 1.5 | 3.0 |
| Shore A Hardness | 82 | 75 | 75 | 80 | 80 | 79 | 80 | 80 |
| Tensile stress at break (psi) | 2489 | 2265 | 2194 | 2210 | 1950 | 1926 | 1800 | 1926 |
| Elongation at break | 638 | 671 | 709 | 620 | 495 | 520 | 498 | 556 |
| 70° C./22 h Comp. Set* (%) | 39 | 34 | 31 | 35 | 39 | 40 | 41 | 42 |
| 100° C./70 h Comp. Set* (%) | 43 | 38 | 41 | 43 | 48 | 42 | 43 | 46 |

*ASTM D395, Method B, Type 1 specimens, stacked plied sheets

The ability to add all the ingredients of a TPV in a preblend can be advantageous in a twin screw extruder, but can be especially advantageous in a single screw extruder where alternative addition ports (e.g., for downstream addition) aren't necessarily available as they are in most twin screw compounding extruders. Thus, while the above examples show that even without encapsulated cure activator the properties are not too much reduced in a twin screw extruder, and might be expected to improve further if downstream port addition methods had been used, the following examples illustrate the significant improvements afforded in a relatively poorly mixing single screw extruder.

Single Screw Extrusion Examples 8-10

The preblend was fed to the hopper/feed throat of a Haake Rheomex 254 single screw extruder (Model 23-13-000 with Screw #038, having an approximately 19 mm diameter barrel with 54.5 cm long screw; the screw was a compression screw with central and final compression zones separated by a decompression zone, without any mixing pins or other mixing sections). The extruder was attached to a Haake Rheocord System 90 drive and control unit and extruded at 100 or 200 rpm and 250° C., or at 200 rpm and 250° C. (100° C. on the feedthroat zone, 200 or 250° C. on the rest of the extruder and die zones) onto a conveyer belt. Output rate is shown in the table of results. Strand product was roll-milled on a Reliable roll mill at 190° C. nominal temperature for 10 passes, sheeted off, then compression molded at 190° C. for 2 minutes at 1000 psi pressure followed by 4 minutes at 30,000 psi, then cooled in chilled platens at 30,000 psi for 4 minutes. Tensile specimens were cut (aligned with the mill direction) and deformed at 5 inches/minute. Shore A hardness was determined after 5 seconds.

Single Screw Extrusion Comparative Examples H-J

The comparative examples were extruded using the same conditions as for Examples 8-10, but using Preblend A The following table shows the dramatic improvement in tensile properties in the TPV's made using an encapsulated cure activator system as compared to TPV's made using a preblend without use of an encapsulated cure activator system.

| Property | Ex. 8 | Ex. 9 | Ex. 10 | Comp. Ex. H | Comp. Ex. I | Comp. Ex. J |
|---|---|---|---|---|---|---|
| Temp (° C.) | 250 | 250 | 200 | 250 | 250 | 200 |
| Screw Speed (rpm) | 100 | 200 | 100 | 100 | 200 | 100 |
| Output Rate (kg/hr) | 3.1 | 5.6 | n.d. | 2.9 | 3.3 | 2.5 |
| Shore A Hardness | 76 | 77 | 78 | 76 | 78 | 76 |
| Tensile stress at break (psi) | 1579 | 1359 | 1993 | 1188 | 984 | 1187 |
| Elongation at break | 515 | 398 | 568 | 306 | 210 | 273 |
| 70° C./22 h Comp. Set* (%) | 42 | 45 | 35 | 43 | 47 | 43 |
| 100° C./70 h Comp. Set* (%) | 61 | 62 | 53 | 51 | 56 | 52 |

*ASTM D395, Method B, Type 1 specimens, stacked plied sheets

We claim:

1. A composition consisting of an ethylene/alpha-olefin/diene polymer (EAODM) having a Mooney viscosity of at least 80, a partitioning agent, and 25 to 300 parts oil per 100 parts polymer, and wherein the composition is in the form of free-flowing particles.

2. The composition of claim 1, wherein the partitioning agent is carbon black.

3. The composition of claim 1, wherein the ethylene/alpha-olefin/diene polymer (EAODM) is prepared from a constrained geometry catalyst.

4. The composition of claim 1, wherein the ethylene/alpha-olefin/diene polymer is prepared from ethylene, at least one $C_3$-$C_{20}$ alpha-olefin and at least one polyene.

5. The composition of claim 4, wherein the at least one alpha-olefin is selected from the group consisting of propylene, isobutylene, butene-1, pentene-1, hexene-1,3-methyl-1-pentene, 4-methyl-1-pentene, octene-1, decene-1 and dodecene-1.

6. The composition of claim 4, wherein the at least one alpha-olefin is selected from the group consisting of propylene, butene-1, hexene-1 and octene-1.

7. The composition of claim 4, wherein the at least one polyene is present in a range from greater than zero to about 10 mole percent, based on the moles of ethylene and alpha-olefin.

8. The composition of claim 1, wherein the ethylene content of the ethylene/alpha-olefin/diene polymer is from 40 to 90 weight percent, based on the total weight of the polymer.

9. The composition of claim 1, wherein the ethylene content of the ethylene/alpha-olefin/diene polymer is from 55 to 75 weight percent, based on the total weight of the polymer.

10. The composition of claim 1, wherein the ethylene content of the ethylene/alpha-olefin/diene polymer is from 60 to 75 weight percent, based on the total weight of the polymer.

11. The composition of claim 4, wherein the ethylene content of the ethylene/alpha-olefin/diene polymer is from 40 to 90 weight percent, based on the total weight of the polymer.

12. The composition of claim 4, wherein the ethylene content of the ethylene/alpha-olefin/diene polymer is from 55 to 75 weight percent, based on the total weight of the polymer.

13. The composition of claim 4, wherein the ethylene content of the ethylene/alpha-olefin/diene polymer is from 60 to 75 weight percent, based on the total weight of the polymer.

14. A composition consisting of an ethylene/alpha-olefin/diene polymer (EAODM) having a Mooney viscosity of at least 80, a partitioning agent, and 25 to 300 parts oil per 100 parts polymer, and at least one antioxidant; and wherein the composition is in the form of free-flowing particles.

* * * * *

UNITED STATES PATENT AND TRADEMARK OFFICE
CERTIFICATE OF CORRECTION

PATENT NO.       : 7,737,205 B2                              Page 1 of 1
APPLICATION NO.  : 10/900001
DATED            : June 15, 2010
INVENTOR(S)      : Susan G. James and Robert T. Johnston It is certified that error appears in the above-identified patent and that said Letters Patent is hereby corrected as shown below:

Title Page;
Please add the assignee on the front of the patent, with the following:

--(73)  Assignee: Dow Global Technologies Inc.
                  Midland, MI (US)--

Signed and Sealed this
Twenty-sixth Day of July, 2011

David J. Kappos
*Director of the United States Patent and Trademark Office*